United States Patent [19]

Krambrock et al.

[11] 4,301,880
[45] Nov. 24, 1981

[54] DEVICE FOR PNEUMATIC CHARGING CONTAINER-TYPE BALANCE

[75] Inventors: Wolfgang Krambrock, Vogt; Nobert Eberhard, Ertingen, both of Fed. Rep. of Germany

[73] Assignee: Waeschle Maschinenfabrik GmbH, Ravensburg, Fed. Rep. of Germany

[21] Appl. No.: 104,903

[22] Filed: Dec. 18, 1979

[30] Foreign Application Priority Data

Dec. 22, 1978 [DE] Fed. Rep. of Germany ....... 2855751

[51] Int. Cl.³ .................... G01G 21/10; B65B 1/16; B65B 1/30
[52] U.S. Cl. .................... 177/189; 141/67; 141/83; 406/33
[58] Field of Search ............ 141/67, 83; 406/23–25, 406/32, 33; 177/184, 189, 119, 98, 165

[56] References Cited

U.S. PATENT DOCUMENTS 3,307,646 3/1967 Hage .................................... 177/98

Primary Examiner—George H. Miller, Jr.
Attorney, Agent, or Firm—Michael J. Striker

[57] ABSTRACT

The pneumatic feeding device for a container balance includes a stationary feeding conduit for the loose material arranged above the container and directed substantially perpendicularly through an adjustable coupling piece into the interior of the container. To compensate for reaction forces resulting from the pneumatic operation of the feeding device, there is provided a pneumatic pressure compensator acting from the outside on the container in counter direction to the reaction forces.

12 Claims, 10 Drawing Figures

DEVICE FOR PNEUMATIC CHARGING CONTAINER-TYPE BALANCE

BACKGROUND OF THE INVENTION

This invention relates generally to pneumatic feeding devices and more particularly, it relates to a pneumatic feeding device for charging a container-type balance with a loose material supplied from a storing container via a rigid or fixed feeding conduit.

In conventional feeding devices of this type, known for example, from German Pat. No. 2 034 983, German Published patent application 2 733 201 or German Pat. No. 1 556 104, the feeding conduit is connected to the container of the balance via an elastic hose which adjusts itself to the movement of the balance beam. This known solution however is disadvantageous for several reasons. Because of the overpressure or the vacuum in the container of the balance the wall thickness of the employed hose has to be relatively large. As a consequence, the elasticity of such a massive hose connection has an influence upon the counter balance or the feeding of charges of the loose material in the container of the balance. In addition, such heavy duty hoses when operated under vacuum, exhibit a different elastic behaviour than when operated under pressure free conditions. For this reason, the calibration of the balance, if possible at all, can be made only with great difficulties. Furthermore, in spite of the elastic connection it is impossible to avoid horizontal pulling forces and the resulting rotary moment acting on the container of the balance during the charging operation.

As far as the known feeding devices are applied for dosing several components of the loose material, the individual feeding lines are united upstream of the elastic hose connection to the container of the balance. Upon charging the container to the desired weight the feeding is usually interrupted and consequently a residual amount of the loose material remains in the elastic hose. This residual amount is subsequently discharged into the container of the balance by a so called free blowing process. Apart from time losses the known dosing methods impair the accuracy of the weighting process inasmuch as residual loose material is different from case to case. The subtraction of this follow-up weight from the total weight of all components is therefore only an unsatisfying solution.

SUMMARY OF THE INVENTION

It is therefore a general object of the present invention to overcome the aforementioned disadvantages.

More particularly, it is an object of the invention to provide an improved pneumatic feeding device of the afore described type in which the rigid feeding conduit terminates above the container of the balance and the loose material is discharged via an outlet pipe directly into the balance container whereby a compensating device compensates for those pulling or compressing forces which act on the balance container and its connection to the feeding conduit due to overpressure or underpressure resulting from the pneumatic feeding operation.

The solution according to this invention, has the advantages that the aforementioned freeing blast process can be completely avoided and consequently the errors caused by this blast process no longer take place. Accordingly, during the weighing operation an accuracy is sustained which hitherto has been obtainable only by application of dosing devices employing a worm conveyor having a coarse/fine control.

The same advantages are also obtainable when several components of the loose material are fed in the same balance container. All feeding conduits corresponding to individual components open into the outlet pipe above the balance container and cooperate therein with closing flaps or the like so that upon reaching the nominal value of one component and the subsequent weighing of the next component there is no after-feed of the preceeding components into the balance container.

The novel feature which is considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. I is a schematic diagram of a prior art suction type pneumatic feeding device for a container balance;

FIG. II is a schematic diagram of a prior art warm conveyor dozing device for a container balance;

FIG. 1a is a sectional side view of a cutaway portion of the device of FIG. 1;

DESCRIPTION OF THE PREFERRED EMBODIMENTS

Referring firstly to FIGS. I and II illustrating prior art feeding devices of this kind, the vacuum necessary for the feeding operation is generated in a suction blower a which is elastically connected via a connecting hose b to the housing c of a filter which is screwed to the cover of the balance container d. A first component of the loose material is stored in a storing container e and is sucked in from the latter into a feeding conduit f whereby a valve q for auxilliary or by-padded air is closed and another valve h in series with the feeding conduit is opened. The required amount of the feeding air stream is sucked in at a suction point j. When the weight of the first component minus a fixedly pre-set after feed amount is attained, the control means for the balance closes the valve h and opens the valve g. This after-feeding process discharges by suction the residual loose material still taking place in the feeding conduit f into the container d of the balance. The stationary part of the feeding conduit is connected to the moveable balance container via a feeding hose. Upon the dosing of the first component of the loose material there follows the dosing of the second component from the storing container l in the same manner as from the storing container e. Both feeding conduits unite preferably upstream of the elastic feeding hose K in so called suction collecting switch n which closes the intake of completed components and brings the flowing processes to rest.

In FIG. II is illustrated a worm conveyor dosing device which according to present knowledge has attained an optimal dosing effect. The loose material is first supplied into a so called service container n from which it is mechanically discharged by means of a dosing worm conveyor o into the balance container b. Upon reaching the nominal value the driving motor g of the worm conveyor is switched-off and simultaneously the discharge opening of the worm conveyor is closed by means of a pressure activated closing valve r. In the case of dosing several components of loose material, there are employed several dosing worm conveyors arranged mostly in a starlike configuration about the balance container.

Figure 1:
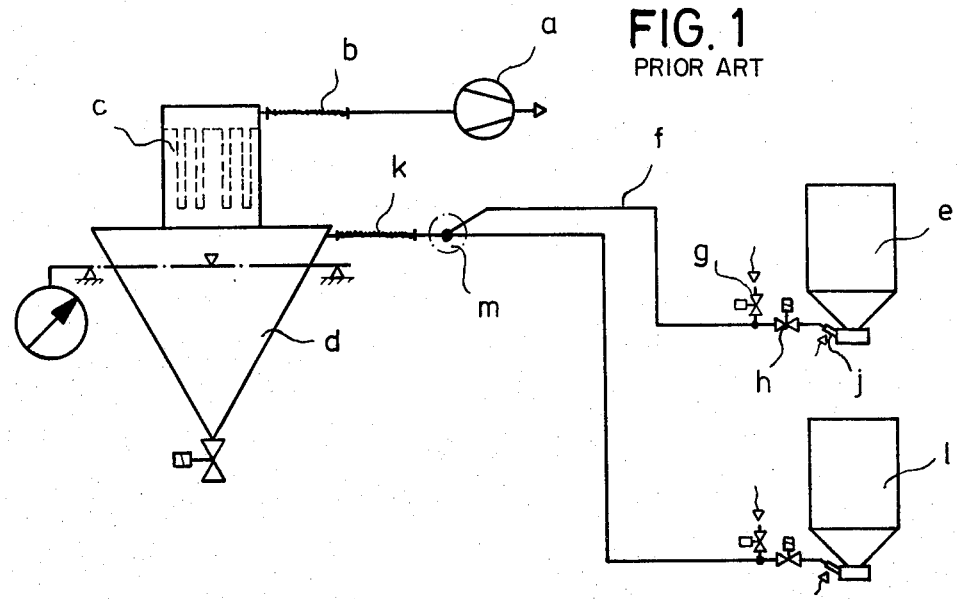
FIG. 1 is a schematic diagram of one embodiment of a pneumatic feeding device for a container balance according to this invention.

FIG. 1 shows a suction type dosing or feeding device of this invention for one component of the loose material. This loose material is sucked into the balance container 2 through a fixed feeding conduit 1. A filter 3 for separating fine particles from the sucked-in air stream is mounted on the cover of the balance container and its outlet is connected by an elastic conduit such as for example a hose 4 to a suction blower 5 which generates the necessary feeding vacuum $\Delta p$. Due to the fact that the balance container 2 is suspended on a movable beam, it is subject to a pulling force Z acting on the container opposite the fixedly arranged feeding conduit 1. The magnitude of this pulling force Z is directly proportional to the cross-sectional area A of the feeding conduit. If, for example, the feeding conduit has a diameter resulting in a cross-section A of about 50 square centimeters and feeding vacuum $\Delta p$ of 200 millibars is employed, there results a pulling force Z of 50 times $0.2 = 10$ kg. Inasmuch as this pulling force Z would cause a distortion in the reading of the actual weight, a counter force Z' of the same magnitude is generated and applied on the balance container 2. For this purpose, a fixed upright pipe 6 having the same diameter as the feeding conduit 1 is applied below the balance container 2 opposite the vertical output pipe of the conduit. The pipe 6 is flexibly connected to a vacuum chamber 7 secured to the outer wall of the balance container 2 to generate the counter force Z'. The vacuum chamber 7 and the interior of the balance container 2 are inter-connected by means of a pressure compensating conduit 8. Due to the fact that the balance container encloses mostly dusty air and since any accumulation of dust in the stationary pipes 6 is to be avoided, the connecting piece 9 between the interior of the container 2 and the compensating conduit A is provided preferably with a filtering bag 10 or with a plug filter.

Figure 2:
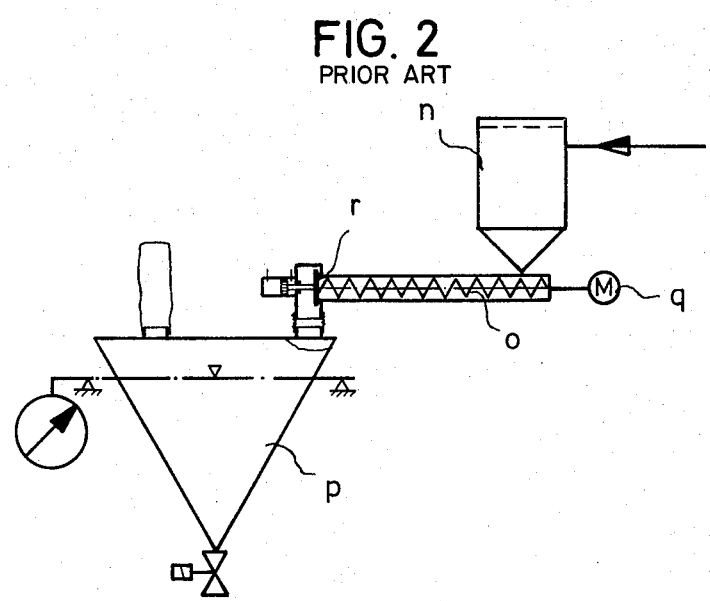
FIG. 2 is a schematic diagram of a second embodiment of the device of this invention.

FIG. 2 illustrates also a suction type weighing and dozing device for feeding three different components of a loose material. The individual feeding conduits 11, 12 and 13 open in the so-called suction collecting switch 14. The open end of each feeding conduit cooperates with a valve unit 18, 19 and 20 controlled respectively by pressure air cylinder and piston units 15, 16 and 17. The moveably suspended balance container 21 is flexibly connected via two compensating diaphragmas 22 and 23 to the stationary or fixedly supported tubular body of the collecting switch 14. If an under pressure resulting from the suction effect during the feeding operation builds up in the interior of the container 21 so as mentioned above, the balance container moves upwardly with a pulling force Z. In order to compensate the pulling force, a compensation cup 24 is arranged above the tubular collecting switch 14 and is rigidly connected by anchoring bolts 25 to the container 21. Inasmuch as the force compensating diaphragmas 22 and 23 have the same geometric configuration, the same pulling force acts on the diaphragm 22 downwardly so that acting on the diaphragma 23 upwardly.

Figure 3:
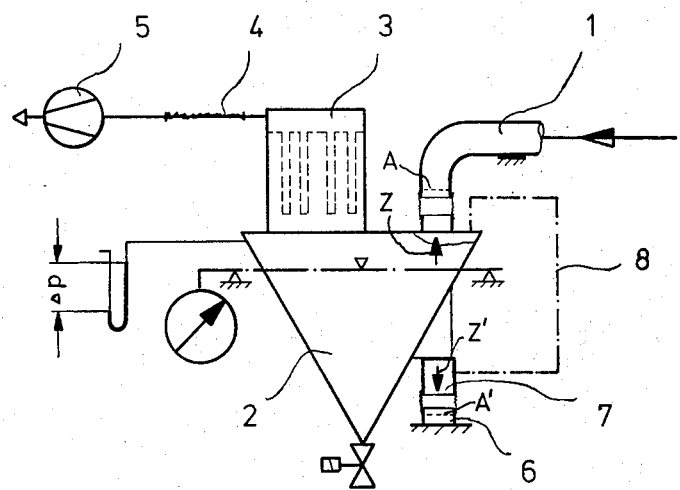
FIG. 3 is a schematic view of a third embodiment of the device of this invention.
Figure 3A:
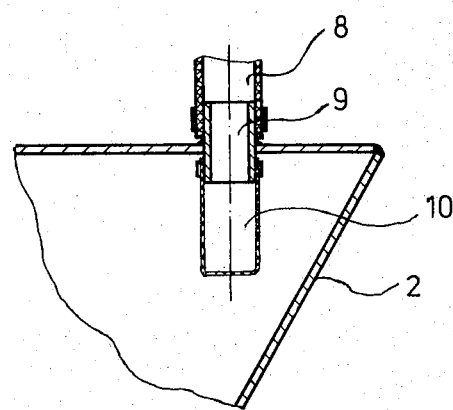

In the embodiment according to FIG. 3 the bent portions of respective feeding conduits 26, 27 and 28 project into the suction collecting pipe 14 in the direction which is more advantageous for the feeding action. In addition, the output end of the collecting tube 14 is bent into an elbow 29 which diverts intermittent forces resulting from the flow of the mixture of solid material from a vertical into a horizontal direction. As a result, the impairment of the weighing process due to such impulsive forces is avoided.

Figure 4:
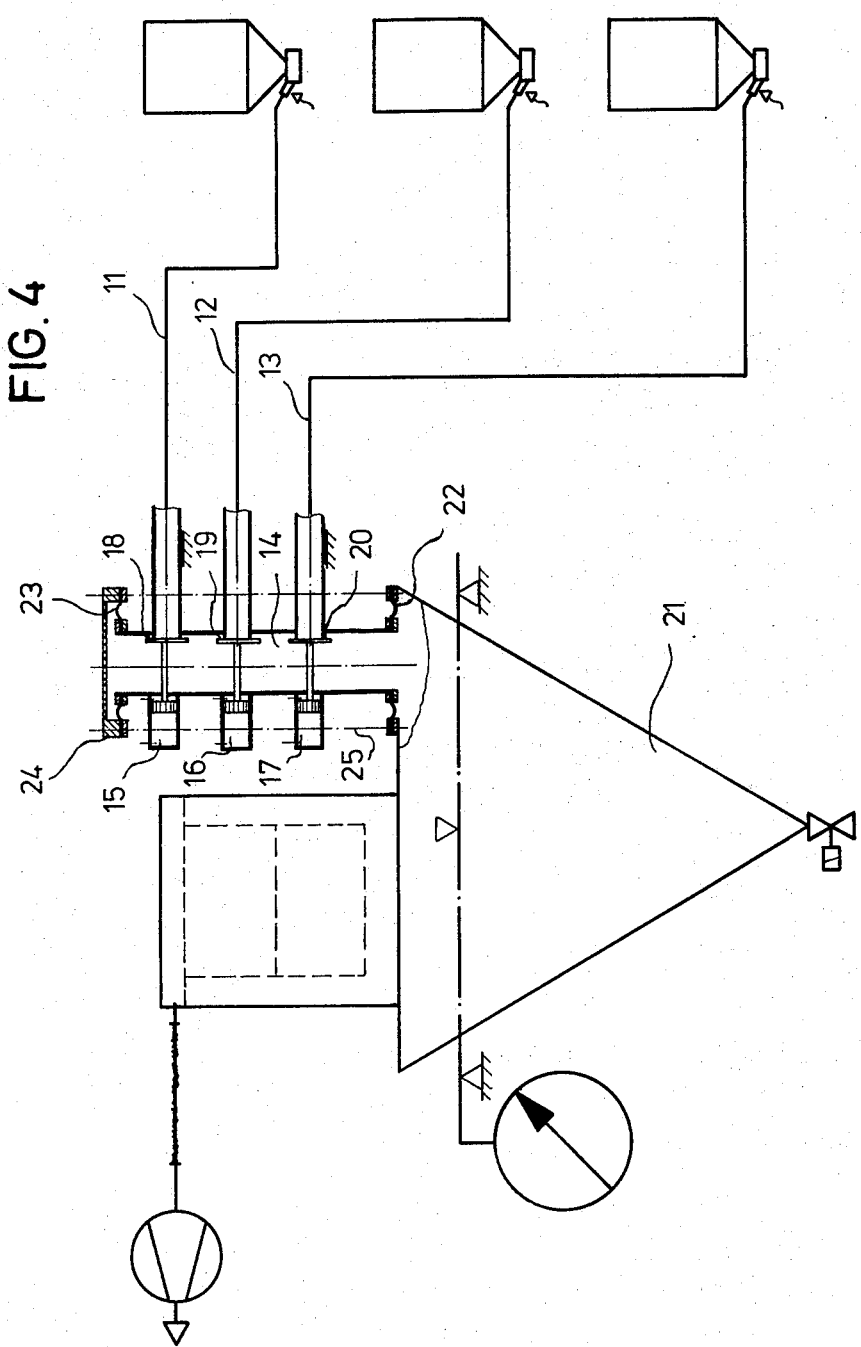
FIG. 4 is a schematic view of a fourth embodiment of the device of this invention employing a pressure feed.

FIG. 4 illustrates a pressure-feed type device according to this invention. Respective components of the loose material are charged from storing containers 26, 27 and 28 one after the other into the balance container 29. To produce the necessary feeding air stream there is employed a common pressure blower 30. If, for example, the first component of the loose material is discharged from the storing container 28, the control of the fed stream from running pressure blower 30 is effected by opening the feed control valve 31 while closing the valve 32 for exhaust air. The dozing takes place with a certain time delay in a vane wheel sluice or valve 33 arranged between the outlet of the storing container 28 and the feeding conduit 34. The tubular suction collecting switch 35 which is arranged as in the proceeding example on top of the balance container 29 communicates with outlet end of respective feeding conduits 34 and to each opening of the latter conduits is assigned a back pressure flap 36. Each of these flaps 36 protect the assigned feeding conduit against return flows during the operation of other feeding conduits and thus prevents the mixing of flows in depressurized feeding conduits. As soon as the desired weight of the supplied component is attained, the feed control valve 31 is immediately closed and simultaneously the charging vane wheel valve 33 is de-energized and the exhaust air valve 32 is opened. Subsequently, the dozing of the second component of the loose material for example from the storing container 27 takes place in the same manner.

In the afore described pressure feed an over pressure builds up in the balance container 29 and reversly directed bosses act on the container at the point of discharge of the loose material than those occuring during the suction feed. This reverse situation can also be fully compensated by compensating means of this invention.

Figure 5:
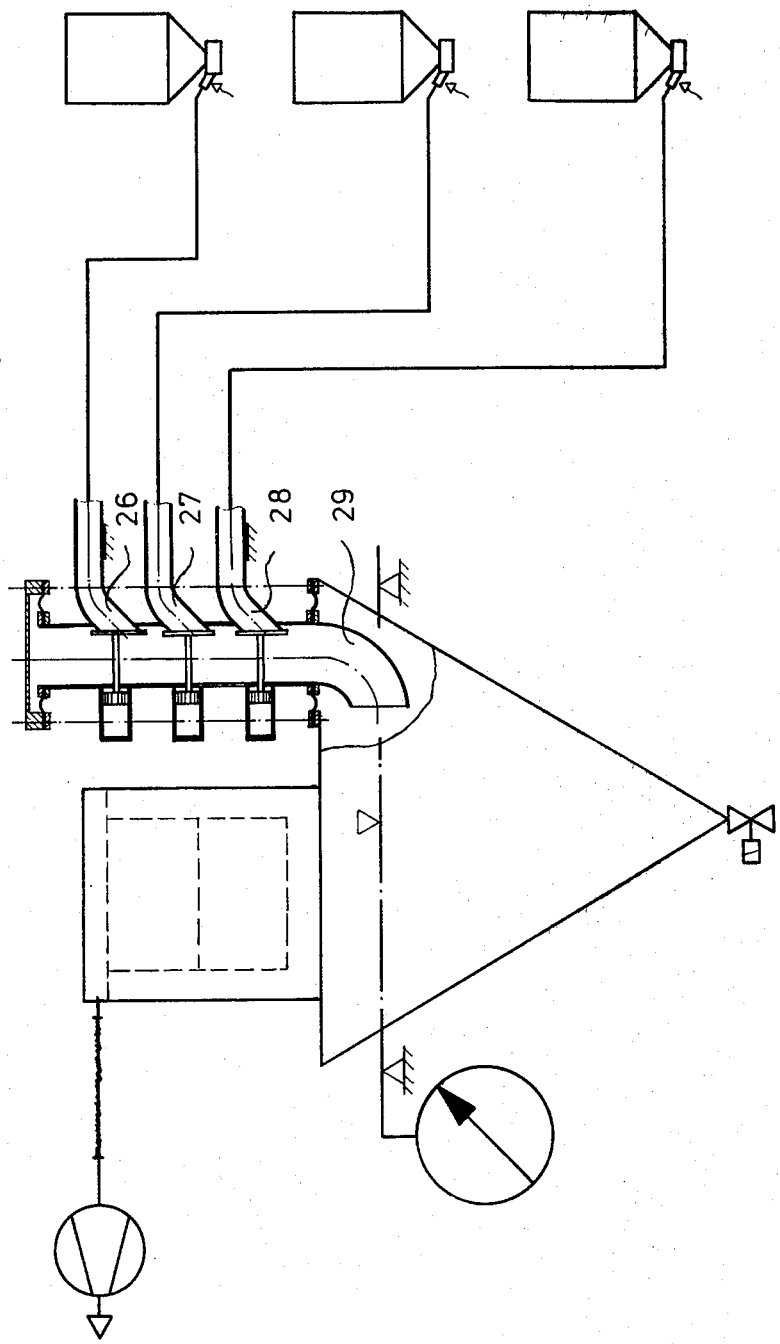
FIG. 5 is a schematic view of a variation of the compensating apparatus in the device of FIG. 1.

FIG. 5 illustrates a variation of the compensating device of this invention including the so called one to one regulator which is suitable particularly for extremely dusty loose material. The whole installation operates with suction. During the feeding process the vacuum builds up in the balance container 39. Since the feeding conduit 37 opens in the balance container vertically, the balance is partially unloaded or pulled upwardly. This upwardly directed pulling force similarly as in the embodiment of FIG. 1 is counteracted by a compensation device 38 arranged on the lower side of the balance container 39 opposite the outlet pipe of the feeding conduit 37. Inasmuch as equal pressure (vacuum) has reestablished both in the chamber of compensating device 38 and in the balance container 39, and due to the fact that the afore described compensation conduit cannot be employed because of excessive contents of dust in the interior of the container 39, there is provided an indirect pressure regulating device 40. The regulating device 40 has an intake port A connected directly to a point of a higher vacuum at the dust free outlet 41 of the main filter 42 wherein the sucked in air is not subject to losses in the main filter. The intake port A communicates with a passage opening as the outer side of a center piece 43 of a diaphragma while the lower side of the central piece is subject to the pressure inside of the balance container 39. If a vacuum builds up in the container 39 due to the pneumatic feeding process, the central piece 43 of the diaphragma is pulled downwardly with a force P. The outlet opening of the passage in the central piece 43 is connected to an outlet port C to the chamber of the counteracting device 38 and also cooperates with a control element or pin 44 which regulates the access of outer air through an additional intake port B to the outlet port C. Due to the afore described downward movement of the central piece 43 of the diaphragm, the control pin 44 closes the inlet of the auxiliary air B and opens the communication between the port C and the port A. As a result a compensating air flow starts flowing from the compensation pipes 38 via the port C, the port A towards the suction blower 45 until the pressure equilibrium is established between the pressure compensating device 38 and the interior of the balance container 39. Due to this pressure equilibrium, the diaphragm member 43 returns to its normal position and the connection between the ports A and C is interrupted. If the vacuum in balance container 39 diminishes, the diaphragma member 43 together with the control element 44 move upwardly due to the larger vacuum in the compensating device 38 and opens the passage between the outer atmosphere and to the port B and the outlet port C. This passage is opened until the pressure balance between the balance container 39 and the compensating device 38 is re-established. This indirect pressure regulating device 40 is adaptable for the pressure feed provided that the inlet port A remains open and the port B is connected to the pressure blower. The regulating principle remains the same only the pressure conditions are different.

Figure 6:
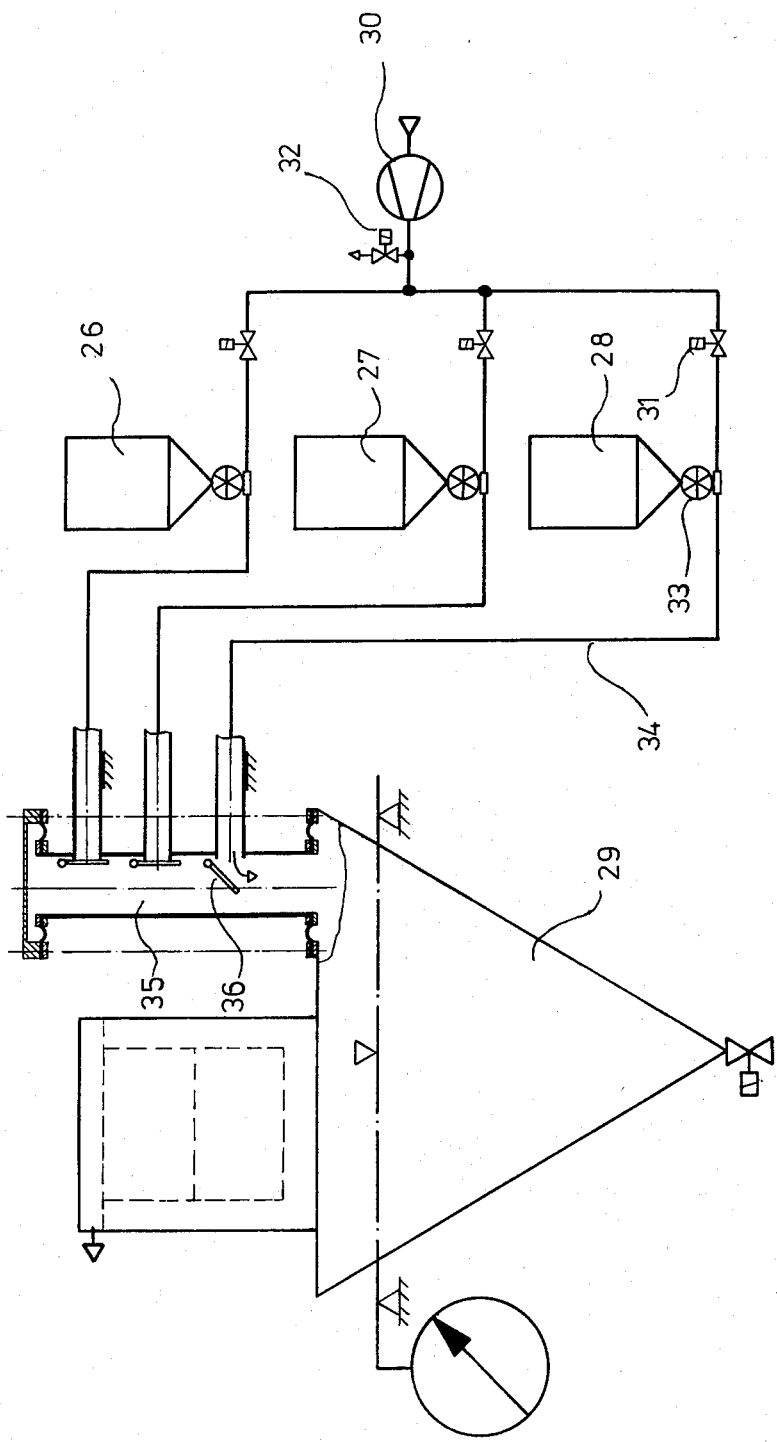
FIG. 6a is a sectional side view of a cutaway portion of the compensating apparatus of FIG. 2, shown in rest position.
FIG. 6b is the apparatus of FIG. 6a shown in an activated position.
Figure 7:
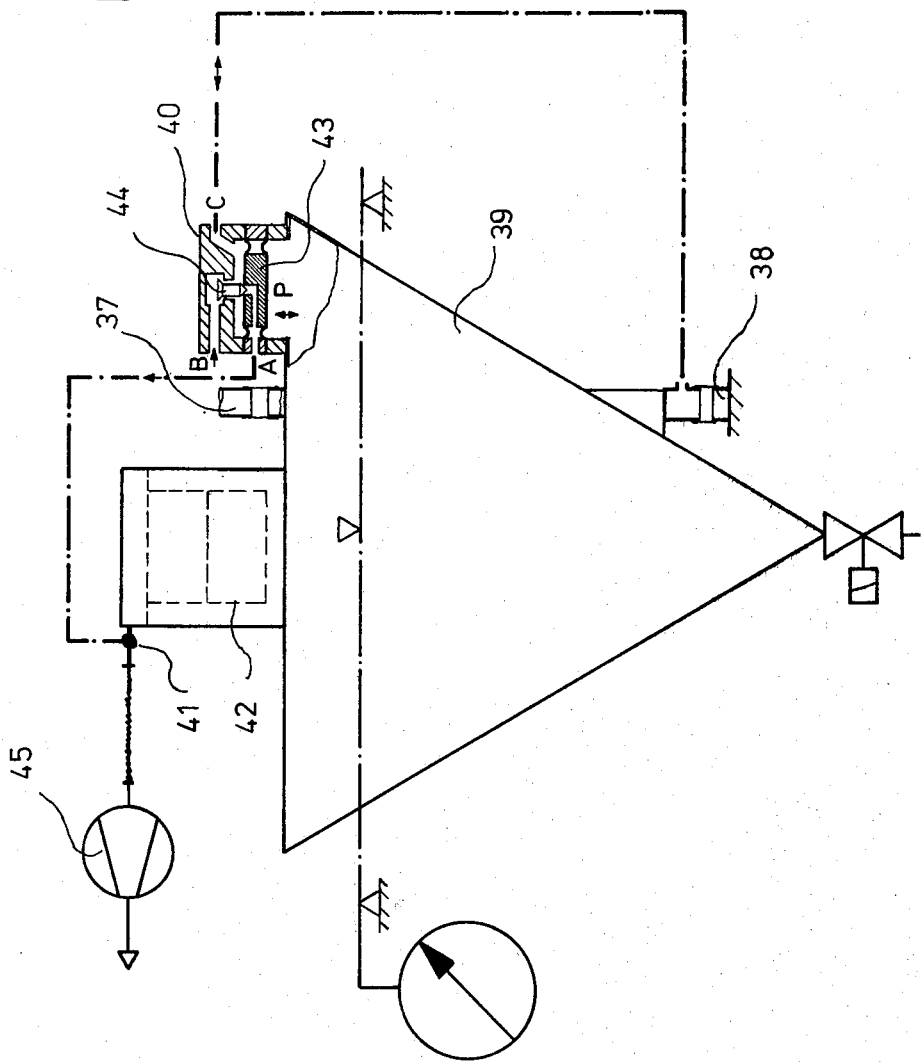
Figure 8A:
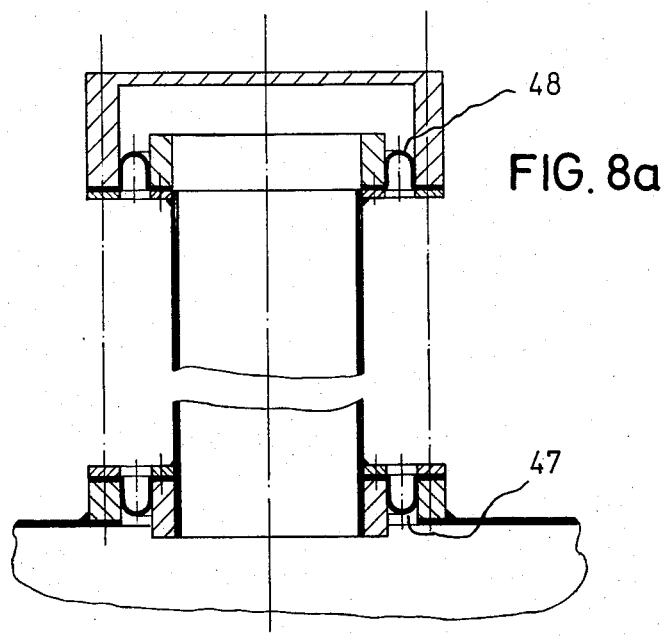
Figure 8B:
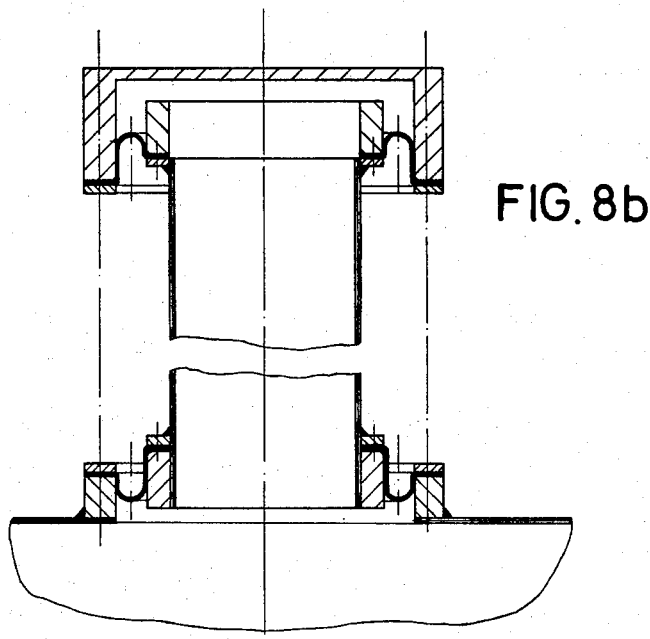

FIGS. 6a and 6b show respectively the pressure compensating device of FIG. 2 in a rest position and in an activated position. Both diaphragmas 47 and 48 have an arcurate cross action which enables the application of the compensating device of this invention also for balances having a large stroke or the beam amounting to several millimeters between the unloaded condition and the fully loaded condition. Such balances are particularly those having graduated circular scale and a scale range below 50 kg.

FIG. 6a illustrates the pressure compensating device of this invention in an unloaded condition of the balance and FIG. 6b shows this device in a loaded condition of the balance. It will be noted that both the lower diaphragma 47 and the upper diaphragma 48 have the same configuration which insures a uniform compensation of the pneumatic reaction forces by the compensating device.

It will be understood that each of the elements described above, or two or more together, may also find a useful application in other types of constructions differing from the types described above.

While the invention has been illustrated and described as embodied in a specific examples of the feeding device for the container balances, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pneumatic device for feeding loose material into a container-type balance, comprising: pneumatic feeding means including a pneumatic circuit in which the container of the balance is connected so as to be subjected to the pneumatic action in the circuit, a rigid feeding conduit arranged in said circuit for discharging the loose material from above into said container; and means for compensating reaction forces acting on said container due to the pneumatic feeding process.

2. A feeding device as defined in claim 1, wherein said feeding conduit discharges said material into said container in a substantially perpendicular direction.

3. The feeding device as defined in claim 1, wherein said compensating means includes a pneumatic force transmitting device.

4. The feeding device as defined in claim 3, wherein said compensating means includes a stationary pressure chamber communicating with the interior of said container of the balance and a moveable member responses to the pressure in the chamber and counter acting said reaction force of said container.

5. The feeding device as defined in claim 4, wherein said pressure chamber includes a stationary pipe section closed at its bottom and a moveable pipe section closed at its top, said pipe sections being flexibly connected one to another and arranged outside said container in alignment with the outlet end portion of said feeding conduit, said pipe sections having the same cross-sectional area as said feeding conduit and said moveable pipe section abutting against the outer surface of said container to counteract said reactive force.

6. The feeding device as defined in claim 4, further including an indirect pressure regulating valve having a diaphragma moveable in response to the pressure conditions in the container of the balance, a first port connected to an outer source of vacuum, a second port communicating with said compensating pressure chamber and a third port communicating with the outer atmosphere, and a control element activated by said diaphragma to establish a pressure balance between said pressure chamber and a respective ports of said regulating member.

7. The feeding device as defined in claim 4, wherein said compensating means includes a stationary tubular member arranged in a substantially perpendicular position above an intake opening in said container of the balance, said feeding conduit communicating with the interior of said tubular member through the jacket of the latter, a first annular diaphragma having its outer peripheral portion secured to the rim of said intake opening of said container and its inner peripheral portion secured to the lower end of said tubular member, a cup shaped counter acting member arranged above the other end of said tubular member and being secured to said container, and a second annular diaphragma arranged between the rim of said cup shaped member and said other end of said tubular member.

8. The feeding device as defined in claim 7, wherein said annular diaphragmas have respectively, an arcuate cross-section to permit an increase vertical displacement of said container.

9. The feeding device as is defined in claim 7, including a plurality of separate feeding conduits for different components of the loose material, each of said separate feeding conduits opening into the jacket of said tubular member, and control valves assigned to respective openings of said feeding conduits in said tubular member.

10. The device as defined in claim 9, wherein said feeding means includes a suction blower connected to the interior of said container.

11. The device as defined in claim 9, wherein the end portion of each feeding conduit is inclined downwardly relative to the axis of said tubular member and the lower end of said tubular member projecting into said container and being bent at a substantially right angle to discharge the loose material in a substantially horizontal direction.

12. The feeding device as defined in claim 11, wherein said feeding means includes a pressure blower connectable to the inlet of said separate feeding conduits, and said control valves include back pressure flaps.

* * * * *